United States Patent [19]
Roder

[11] 3,982,125
[45] Sept. 21, 1976

[54] METHOD AND APPARATUS FOR PROVIDING HEIGHT VARIATION COMPENSATION IN CERTAIN NUCLEAR GAUGING APPLICATIONS INCLUDING NUCLEAR MINE DETECTION

[75] Inventor: Frederick L. Roder, Falls Church, Va.

[73] Assignee: The United States of America as represented by the Secretary of the Army, Washington, D.C.

[22] Filed: Jan. 9, 1975

[21] Appl. No.: 539,883

[52] U.S. Cl. .............................. 250/253; 250/272; 250/358 R; 250/366; 250/492 R
[51] Int. Cl.² .......................................... G01V 5/00
[58] Field of Search ........... 250/366, 367, 253, 358, 250/359, 360, 272, 273, 492

[56] References Cited
UNITED STATES PATENTS

| | | |
|---|---|---|
| 2,897,371 | 7/1959 | Hasler ............................. 250/273 |
| 2,997,586 | 8/1961 | Scherbatskoy ..................... 250/358 |
| 3,100,261 | 8/1963 | Bigelow ............................ 250/272 |
| 3,114,832 | 12/1963 | Alvarez ............................. 250/272 |
| 3,435,220 | 3/1969 | Hanken ............................ 250/358 |
| 3,505,520 | 4/1970 | Stewart ............................ 250/360 |

*Primary Examiner*—Harold A. Dixon
*Attorney, Agent, or Firm*—Nathan Edelberg

[57] ABSTRACT

A method and apparatus for compensating for height variations in certain nuclear gauging applications, particularly nuclear mine detection, are disclosed. A source of monoenergetic photons and a pair of detectors are provided. One of the two detectors includes a K-edge filter, whereas the second detector does not. After processing, the outputs of the two detectors are applied to a suitable readout device. The combination of the filtered detector and unfiltered detector provide a means to compensate for any height variation of the source-detector assembly above the medium under study; thereby permitting any change in the average atomic number of that medium to be discerned.

3 Claims, 2 Drawing Figures

METHOD AND APPARATUS FOR PROVIDING HEIGHT VARIATION COMPENSATION IN CERTAIN NUCLEAR GAUGING APPLICATIONS INCLUDING NUCLEAR MINE DETECTION

The invention described herein may be manufactured, used, and licensed by or for the Government for Governmental purposes without the payment to me of any royalties thereon.

BACKGROUND OF THE INVENTION

This invention relates to nuclear gauging; and more particularly to a method of apparatus that provides height compensation in nuclear gauging applications wherein the average atomic number of a scattering medium is being monitored, such as nuclear mine detection.

In nuclear gauging, the number and energy distribution of gamma and/or x-ray photons detected at a given point is space per unit time from a radiation source is a function of source type, source-detector geometry, and the density and elemental composition of the surrounding media. By keeping any three of these variables constant, it is possible to design a nuclear gauge which will monitor the fourth. Such nuclear gauges are routinely used in industry to monitor, for example, the thickness of sheet metal or the void fraction of fluid flow through a pipe. Such nuclear gauges have proven highly successful and are routinely utilized; however, attempts to apply nuclear gauging techniques to, for example, the detection of nonmetallic landmines have not been as successful, due to certain problems encountered when attempting to apply prior-art nuclear gauging techniques to such an application.

Nonmetallic landmines differ from the surrounding soil medium in elemental composition. Explosives are composed entirely of light elements such as hydrogen, carbon, nitrogen, and oxygen (H, C, N, O), while soils consist of oxygen and somewhat heavier elements, such as aluminum, silicon, and iron (O, Al, Si, Fe). The average atomic number (Z) of explosives is approximately 5, whereas that of typical soils is approximately 11. Since the macroscopic photoelectric cross section varies approximately as the fourth power of atomic number, the photon flux backscattered from a half space above which a source of gamma radiation has been suspended will vary appreciably with the inverse of the atomic number of that half space in the energy region where the photoelectric cross section is an appreciable fraction of the total cross section. Considering the four variables mentioned above and the fact that three of the four variables are to be held constant to monitor the fourth, it is obvious that a practical mine detector can be designed if the source type, source-detector geometry, and the density of the soil can be held constant or variations compensated for while the elemental differences between the soil and landmines are monitored.

In designing a gamma backscatter mine detector, both the gamma source and the geometry of the sensor are determined. Unfortunately, the source-detector geometry depends, not only on the sensor geometry, but also on the location of the sensor relative to the soil interface. Since in operation the height of the sensor above the soil cannot from a practical standpoint be held constant, some means had to be devised to compensate for height variations. (Soil density variations do occur, but their effect is small compared to the effect of Z variations. On the other hand, height changes of as little as an inch can, given certain sensor geometries, entirely mask a change in Z by a factor of 2.)

This invention provides a method for compensating for the effects of height variations in nuclear landmine detectors and delineates one type of apparatus suitable for implementing this method. While the invention is ideally suited for nuclear landmine detection, the invention is also useful in more conventional nuclear gauging applications where the distance from a backscatter sensor to the material of interest cannot be held constant.

SUMMARY OF THE INVENTION

This invention comprises basically a radiation source and a pair of detectors. One of the detectors is provided with a K-edge filter while the other detector is unfiltered. The filter provided is the nuclear equivalent of a low-pass filter, i.e., the filter is relatively transparent to photons below a certain energy while opaque to photons of higher energies. The particular element used to make the filter depends upon source energy and details of the source-detector geometry; however, for gamma backscatter mine detectors utilizing a 241 Am (60keV) source, europium is the most suitable filter material. By providing a K-edge filter in accordance with this invention, compensation for any height variation in the searchhead above the soil's surface in landmine detection or for any height variations a sensor above the surface of the material of interest in general nuclear gauging applications is achieved.

BRIEF DESCRIPTION OF THE DRAWING

The exact nature of the invention can be obtained from the following detailed description when read in conjunction with the annexed drawing in which.

DETAILED DESCRIPTION OF THE INVENTION

Figure 1:
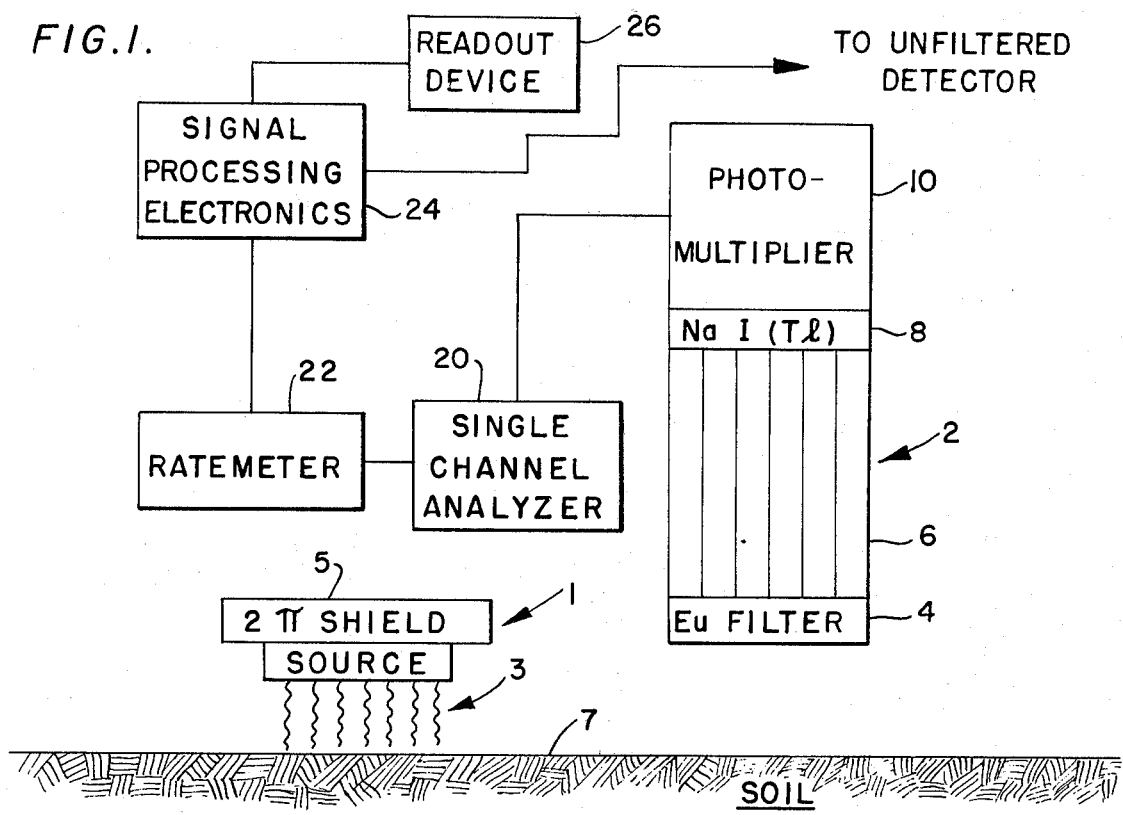
FIG. 1 is a first view of a preferred embodiment of the invention.
Figure 2:
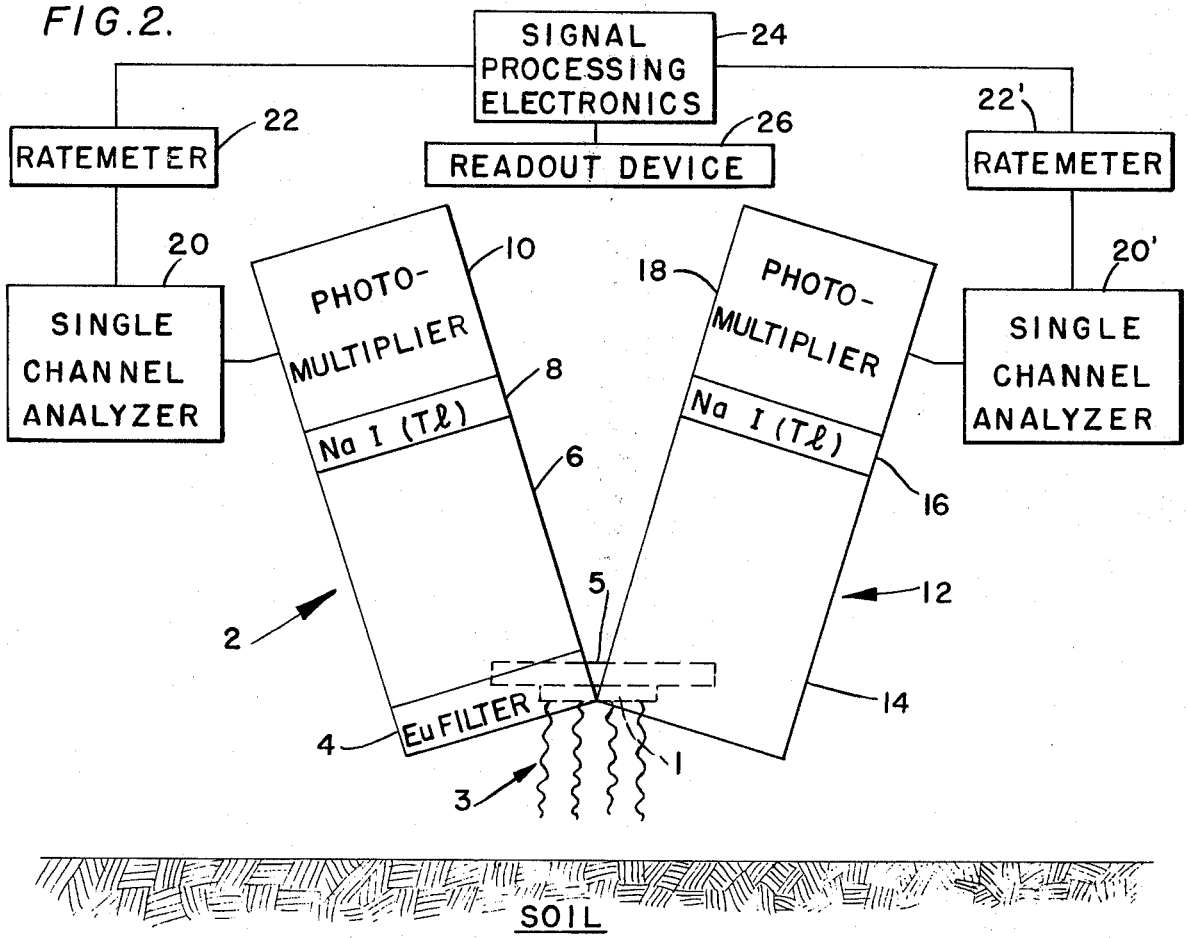
FIG. 2 is a second view of the preferred embodiment of the invention showing the two detectors.

Before describing a preferred apparatus for implementing the invention (as shown in FIGS. 1 and 2), the basic concepts applicable to this invention will be described, since an understanding of these concepts is believed to provide for a more complete understanding of the invention and particularly the operation of the invention.

For incident gamma-ray energies below the threshold for pair production, all photons backscattered from a medium will have undergone one or more Compton scattering events. For singly scattered photons, the energy of the backscattered photon, E, is related to the energy of the incident photon Eo, and the angle of scatter $\theta$, by the Compton scattering equation $$E = \frac{E_o}{1 - \frac{E_o}{m_e c^2}(1 - \cos\theta)}$$

It is noted that E is unrelated to the composition of the scattering medium.

Whether or not singly scattered photons are received by a radiation detector depends on the geometry of the problem. For the case of mine detection the geometry of primary interest is as follows:

An uncollimated gamma-ray source radiates isotropically into 2 $\pi$. One or several vertically collimated detectors are then employed to view areas of the soil's surface irradiated by the source. For such a sensor geometry, each detector receives (1) no unscattered photons; (2) a large number of singly scattered photons; and (3) a somewhat smaller number of multiply scattered photons. The multiply scattered photons are (1) generally of lower energy than singly scattered photons; (2) far more dispersed in energy than singly scattered photons; and (3) far more sensitive to the presence of a mine (Z anomaly) than singly scattered photons.

As the height of a sensor above the soil's surface decreases, the number of both multiply and singly scattered photons increases. Such an increase might be interpreted as an alarm (an increase predominantly in the multiple scatter component) if not compensated for.

Since the energy of singly scattered photons varies with scattering angle, and since the single scatter angle varies with sensor height, it is theoretically possible to compensate for height variations if a means can be found to detect this minute change in energy of the singly scattered photons. The use of a K-edge filter provides just such a means. All elements have high photoelectric cross sections (i.e., are highly attenuative) at photon energies just above the binding energy of their innermost (k) electrons, and substantially lower photoelectric cross sections at photon energies just below this binding energy. By interposing between the backscattered photon flux and the radiation detector a filter material whose K-edge (K-electron binding energy) falls within the range of energies exhibited by singly scattered photons, it is possible to obtain a sensor-height-versus-detected-flux response curve with a substantially different slope than than obtained for an unfiltered detector. (Singly scattered photons exhibit a range of energies because finite source and detector dimensions permit a range of single-scatter angles.) (Note that, using this technique, the radiation detectors themselves do not have to be energy-resolving.) The ratio of the (background-subtracted) response from an unfiltered detector to that from a filtered detector is then a unique function of sensor height alone over a finite range of heights. If the atomic number of the scattering medium is then varied, the magnitude of the response from both detectors will vary, but the ratio of their (background-subtracted) responses will not. By suitably processing the response from two detectors (one filtered and one unfiltered) viewing the same area, it is then possible to automatically compensate for sensor height variations and thereby detect changes in atomic number.

Referring now to FIGS. 1 and 2, these Figures show a preferred embodiment of the invention. FIG. 1 is a side view of the apparatus and FIG. 2 is a rear view; therefore in FIG. 1, only one of the detectors is visible. As shown in FIGS. 1 and 2, the invention comprises an isotopic source 1 emitting monoenergetic photons 3 positioned beneath a 2 $\pi$ shield 5, a pair of detectors 2 and 12, and the associated electronic circuitry. Detector 2 is a NaI (Tl) detector as indicated by the numeral 8 with a honeycomb collimator 6. Detector 12 is also a NaI (Tl) detector as indicated by the numberal 16 with a honeycomb collimator 14. Detector 2 is provided with a photomultiplier 10 and detector 12 is provided a photomultiplier 18. Identical electronic circuitry is provided for each detector. Thus, the output of photomultiplier 10 is coupled to a single channel analyzer 20, which in turn is coupled to a ratemeter 22. The output of ratemeter 22 is coupled to the signal processing electronics 24. Similarly, the output of photomultiplier 18 is coupled to a single channel analyzer 20' which in turn is coupled to a ratemeter 22'. The output of ratemeter 22' is also coupled to the signal processing electronic 24. The output from signal processing electronic 24 is coupled to a suitable readout device 26. It should be noted that this apparatus is given by way of example only. Any suitable detectors (energy resolving or not) and processing circuitry can be utilized.

By way of example, the source of monoenergetic photons 3 may be a 241 $_{Am}$ (60keV) source. For a source-detector separation of 2 inches and a 241 $_{Am}$ (60keV) source, the change in energy of a singly scattered photon, emitted from the center of the source, scattering at 0.5 inches below the soil's surface 7, and absorbed at the center of a detector, would be 0.75 keV (49.62 keV to 48.87 keV) over an operating range from 2 to 5 inches. Considering a practical case of a 1 inch diameter source and a 1 inch diameter detector with a honeycomb collimator with a 10° half angle, the maximum single-scatter-photon energy for a detector-soil separation of 2 inches would be 50.24 keV, while the minimum energy (considering the maximum scatter depth to be 1 inch below surface 7) would be 48.83 keV. Also, recalling the above discussion of K-edge filters, detector 2 is provided with a Eu filter 4. Europium has a K-edge (binding energy of the innermost electron) of 48.515 keV, which, recalling the above discussed energies, makes europium a desirable filter material, since, as the sensor height increases, more and more of the singly scattered photons will have energies below 48.515 keV and will therefore penetrate filter 4. Detector 12 is unfiltered. In general, any monoenergetic photon source may be utilized, provided the single scattered photons reaching the detectors are of energies less than approximately 115.6keV, the highest K-edge available with a naturally occurring filter material (uranium).

While the invention has been specifically described with reference to nuclear mine detection, the apparatus of this invention can be used in any nuclear gauging application where the distance from the backscatter sensor to the material of interest cannot be held constant. In addition, while the invention has been described with reference to a specific embodiment, it will be apparent to one skilled in the art that various modifications and changes can be made to the embodiment shown and described without departing from the spirit and scope of the invention as set forth in the claims.

What is claimed is:

1. A photon backscatter nuclear gauging system which enables compensation for variation in system placement comprising:

a photon radiation source having a monenergetic output and adapted such that a medium to be discerned is irradiated by said source when said source is disposed substantially at a selected distance therefrom;

first and second collimated detector means disposed in selected relation with respect said source, each of said detector means having a respective selected orientation with respect said medium to be discerned and each detector means adapted to detect photon backscatter reflected from said medium;

a photon energy discriminator means of the K edge filter variety, said photon energy discrimination means disposed between said first detector means and said medium to be discerned and adapted to filter photon backscatter impinging upon said first detector;

and electronic circuitry means associated with said first and second detectors and adapted to process the output of said first and second detectors such that a signal output representative of the average atomic number of said medium to be discerned is obtained.

2. A nuclear gauging system as defined in claim 1 wherein said first and second detectors have substantially the same orientation with respect said medium to be discerned and said detectors have substantially identical means for collimating associated therewith.

3. A nuclear gauging system as defined in claim 2 wherein said first and second detectors are both NaI (T) detectors with associated first and second photomultiplier means.

* * * * *